: 3,047,601
Patented July 31, 1962

3,047,601
SEPARATION OF THORIUM FROM RARE EARTH VALUES IN AQUEOUS ACIDIC SOLUTION BY SOLVENT EXTRACTION WITH AN ALKYL PHOSPHATE-OXYGEN CONTAINING ORGANIC DILUENT
Oliver Johnson, Berkeley, Calif., assignor to the United States of America as represented by the United States Atomic Energy Commission
No Drawing. Filed Oct. 18, 1950, Ser. No. 190,867
2 Claims. (Cl. 260—429.1)

This invention deals with the separation of metal values from aqueous solutions by means of extraction with alkyl phosphate and in particular with the separation of actinide elements in at least the tetravalent state and tetravalent cerium values.

It is an object of this invention ot provide a process for separating metal values from aqueous solutions by means of extraction with alkyl phosphate in which an especially fast and complete separation of the phases is obtained.

It is another object of this invention to provide a process for separating metal values from aqueous solutions by means of extraction with alkyl phosphate in which a high degree of metal separation is obtained so that a high yield of the metal to be produced or recovered is effected.

It is another object of this invention to provide a process for separating metal values from aqueous solutions by means of extraction with alkyl phosphate in which the metal compounds are obtained in a high degree of purity.

It is another object of this invention to provide an improved process for separating actinide metal values and cerium values from rare earth metal values contained in aqueous solution by means of extraction with alkyl phosphate.

It is still another object of this invention to provide an improved process for decontaminating uranium values from ruthenium and other fission product values contained in aqueous solutions by means of extraction with alkyl phosphate.

These and other objects are accomplished by diluting the alkyl phosphate extractant with a substantially water-immiscible organic solvent of a lesser specific gravity than water, and contacting the aqueous solution with this mixture; the aqueous phase is then separated from the solvent extract phase formed.

Alkyl phosphates that are best suitable as extractants are of relatively high density and viscosity, due to which phase separation is rather difficult and slow. This disadvantage is overcome by the use of a diluent. The mixture of diluent and alkyl phosphate, according to this invention, yielded the further unexpected advantage of a considerable increase of extraction.

While the extraction according to this invention may be carried out from any aqueous salt solution, it is preferred to use solutions containing free mineral acid; hydrochloric acid and, in particular, nitric acid are suitable in a concentration ranging from 0.1 to 7 N, higher acid concentrations resulting in higher extraction values. In the case of nitric acid, a concentration of from 1 to 7 N, and preferably of from 3 to 7 N, are satisfactory.

All alkyl phosphates, which are substantially water-immiscible and stable, and in particular which do not decompose, at least substantially, with the acid and/or the metal salts present in the aqueous solution to be treated, are suitable for the process of this invention. Alkyl phosphates of the formula $R_2R'PO_4$, where R indicates either an alkyl radical or a hydrogen atom and R' an alkyl radical, have been used successfully. For instance, tributyl phosphate, trioctyl phosphate, dioctyl hydrogen phosphate, trihexyl phosphate, octadecyl dihydrogen phosphate and mixtures thereof are suitable for the process of this invention.

The diluents for the alkyl phosphate solvent should have a specific gravity lower than that of water and preferably less than 0.8. The diluents should also preferably have a low viscosity, should be miscible with the alkyl phosphate but substantially immiscible with water. It is also desirable that the diluents have a low volatility and a high flash point, preferably a flash point higher than 35° C. so that fire hazards are reduced. Finally the diluent, just like the solvent, has to be stable in the strong acids used and, in particular, in concentrated nitric acid. A great number of ethers, esters and other oxygen-containing organic solvents were found to have the required properties; examples of suitable diluents are: dibutyl ether, isoamyl acetate, diisopropyl ether, pentaether (dibutyoxytetraethylene glycol) of mixtures thereof.

The proportions between solvent and diluent are not critical, and it will be readily understood that a higher solvent content brings about a higher extraction efficiency per se, while a higher content of diluent will facilitate phase separation and thereby improve the degree of the separation desired. It was found that the mixture advantageously contains at least 60% by volume of diluent but not more than 97%, a content of from 75 to 95% being preferred. One of the preferred mixtures contains from 10 to 25%, preferably 20%, by volume of tributyl phosphate in dibutyl ether.

A further factor which has a favorable effect on the extraction is the presence of a salting-out agent. While the acids preferably present in the aqueous solution act as salting-out agent, additional water-soluble salts give the better results. It is especially advantageous to add a water-soluble salt that contains the same anions as the salt present of the metal values to be recovered or extracted. The salting-out agent is preferably present in a concentration of at least 3 N and preferably of from 5 to 10 N.

The process of this invention has a great number of applications. For instance, it is usable for the extraction of uranium values from aqueous solutions such as have been obtained from monazite sand, pitchblende, carnotite and other uranium-containing minerals. The process has also been found advantageous for the treatment of uranium metal solutions obtained from power-producing neutronic reactors where the uranium is to be separated from the fission product values before re-use.

EXAMPLE I

Examples for the extractability of thorium nitrate from various feed solutions with various mixtures of tributyl phosphate and dibutyl ether are given in the following table.

Table I

| Organic composition, tributyl phosphate: Dibutyl ether | Ratio in each ext'n step of organic/ aqueous feed soln. | Composition of aqueous feed soln. | Cumulative percent thorium extracted | | | |
|---|---|---|---|---|---|---|
| | | | 1st ext'n. | 2nd ext'n. | 3rd ext'n. | 4th ext'n. |
| 10:90 | 2 | 3 M Ca(NO₃)₂, 0.44 M Th(NO₃)₄, 0.15 M HNO₃ | 44 | 86 | 98.7 | |
| 10:90 | 2 | 3 M Ca(NO₃)₂, 0.44 M Th(NO₃)₄, 0.15 M HNO₃ | 38 | 69 | 91 | 93.5 |
| 10:90 | 2 | 2 M Ca(NO₃)₂, 0.63 M Th(NO₃)₄, 0.15 M HNO₃ | 34 | 69.5 | 93.4 | |
| 20:80 | 2 | ——do—— | 66 | 94.6 | | |
| 20:80 | 2 | 3 M Ca(NO₃)₂, 0.44 M Th(NO₃)₄, 0.15 M HNO₃ | 72 | | | |
| 20:80 | 1 | 2 M Ca(NO₃)₂, 0.63 M Th(NO₃)₄, 0.15 M HNO₃ | 32 | 68.2 | 93 | |
| 20:80 | 0.75 | ——do—— | 24 | 50 | 80 | 94 |
| 20:80 | 1 | 2 M Ca(NO₃)₂ 0.63 M Th(NO₃)₄ 0.5 M HNO₃ | 31 | 70.4 | 93.4 | |
| 25:75 | 2 | 3 M Ca(NO₃)₂ 0.44 M Th(NO₃)₄ 0.15 M HNO₃ | 93 | 99 | | |
| 25:75 | 2 | 2 M Ca(NO₃)₂ 0.44 M Yh(NO₃)₄ 0.15 M HNO₃ | 85 | 97.5 | | |
| 50:50 | 1 | 3 M Ca(NO₃)₂ 0.44 M Th(NO₃)₄ 0.15 M HNO₃ | 82 | 99 | | |

This table shows that, as was to be expected, a higher concentration of tributyl phosphate in the extractant and greater quantities of tributyl phosphate yield higher extraction values than lower ones. Likewise, an increase of the concentration of salting-out agents, nitric acid and calcium nitrate, improve the extraction of thorium values. However, a more diluted aqueous feed solution with regard to thorium nitrate concentration is more favorable than one of higher concentration.

In all the examples compiled in Table I, lanthanum was also present in the feed solution. An average separation factor $$\left(\frac{La}{Th}\text{ in aqueous feed solution}:\frac{La}{Th}\text{ in solvent extract phase}\right)$$

of 270 was ascertained.

EXAMPLE II

Similar tests with similar feed solutions were also carried out in a continuous large scale process where the feed solution and a tributyl phosphate-dibutyl ether (20:80) mixture were countercurrently introduced into an extraction column and where the extracted thorium was back-extracted by means of water from the solvent extract phase formed. The flow rates used were 6.5 to 7 gals./hr. for the feed solution, 34 gals./hr. for the solvent mixture, 3.5 gals./hr. for the scrub solution (aqueous Ca(NO₃)₂—HNO₃ solution) and 4 gals./hr. for the water for back-extraction. An over-all extraction (extraction and back-extraction) of about 99% thorium was obtained.

EXAMPLE III

In another instance, macroscopic amounts of neodymium were added to feed solutions containing 3 M Ca(NO₃)₂, 0.44 M Th(NO₃)₄ and varying concentrations of nitric acid; extraction separation tests were carried out as in the previously described examples using a mixture of 20% of tributyl phosphate and 80% by volume of dibutyl ether. The results with regard to the neodymium extraction are given in the following table.

Table II

| HNO₃ concn. of feed soln., M | Neodymium concentration, M | | Distribution coefficient (organic/aqueous) |
|---|---|---|---|
| | Aqueous raffinate | Solvent extract phase | |
| 1 | 0.0126 | No detection ¹ | <0.048 |
| 2 | 0.0132 | ——do—— | <0.046 |
| 3 | 0.0128 | ——do—— | <0.047 |
| 4 | 0.0133 | ——do—— | <0.045 |

¹ Minimum detection=0.0006 mole/liter.

This table shows that neodymium, as a representative of the rare earth metals occurring together with thorium, is practically inextractable with the tributyl phosphate-dibutyl ether mixture so that a good separation from thorium is obtained by the process of this invention.

EXAMPLE IV

Another experiment, in order to determine the separation of rare earth metal values from thorium values, was carried out with a feed solution having the following rare earth metal contents expressed in parts per million of thorium metal:

Cerium _____ 24
Lanthanum _____ 8
Neodymium _____ 6
Praseodymium _____ 3
Samarium _____ 0.8
Yttrium _____ 1
Gadolinium _____ 0.5
Dysprosium _____ 0.1

A mixture of 20% by volume of tributyl phosphate and 80% by volume of dibutyl ether was used as the extractant. From an analysis carried out of the aqueous raffinate after extraction, it was ascertained that the $$\frac{\text{Concentration of Rare Earth Metals}}{\text{Concentration of Thorium Metal}}$$

in the aqueous raffinate divided by the corresponding ratio in the feed solution amounted to about 14,000 and that the following quantities of the individual rare earth metal values (expressed in parts per million of thorium metal) had been extracted with the thorium:

Cerium _____ 0.23
Lanthanum _____ 0.34
Neodymium _____ <0.006
Yttrium _____ <0.005
Dysprosium _____ <0.002
Gadolinium _____ <0.002

The total of rare earth metal values present was less than 1 p.p.m. of thorium metal. These data show the process of this invention is applicable to the separation of thorium values from rare earth metal values which is of importance, for instance, in the case of the recovery of elements from monazite sand solutions or similarly composed mineral solutions.

EXAMPLE V

That the process of this invention is very well suited for the separation of uranium values from aqueous solutions varying widely in nitric acid concentration is obvious from the set of experiments compiled in the following table. For these tests the aqueous phase was 0.2 M in uranyl nitrate hexahydrate and 0.2 M in thorium nitrate tetrahydrate. Ten ml. of aqueous solution were equilibrated in each instance with 10 ml. of the solvent mixture, and a temperature of 25° C. was maintained for both liquids. The settling times, which are the times for the formation of the interface, were determined after shaking by hand for one minute. The distribution coefficients (organic/aqueous) were determined after an equilibration of thirty minutes. This table also very clearly illustrates the reduction of the settling times by the use of a higher percentage of diluent.

*Table III*

| $HNO_3$ concn. in orig. aq. phase, N | 25% tributyl phosphate+75% dibutyl ether | | 50% tributyl phosphate+50% dibutyl ether | | 75% tributyl phosphate+25% dibutyl ether | |
|---|---|---|---|---|---|---|
| | Settling time, sec. | Distribution coefficient uranium | Settling time, sec. | Distribution coefficient uranium | Settling time, sec. | Distribution coefficient uranium |
| 1 | 47 | 4.0 | 120 | 8.6 | 240 | 11 |
| 3 | 33 | 7.0 | 130 | 16.0 | 250 | 24 |
| 5 | 47 | 7.2 | 130 | 21.0 | 215 | 38 |
| 7 | 43 | 5.3 | 120 | 18.0 | 175 | 45 |
| 9 | 47 | 4.0 | 95 | 12.0 | 160 | 31 |
| 11 | 60 | 2.7 | 85 | 8.0 | 110 | 20 |

EXAMPLE VI

A series of batch tests was carried out wtih an aqueous nitric acid solution obtained from dissolving monazite sand and containing 38 mg. of $U_3O_8$, 1130 mg. of $ThO_2$, 5605 mg. of rare earth metal oxides, 5073 mg. of $Ce_2O_3$ and 164 mg. of $P_2O_5$ per 100 ml. of solution; the solution was 5 N in nitric acid. A volume of 50 ml. of this aqueous solution was equilibrated at 25° C. for thirty minutes with an equal volume of a solvent mixture consisting of 25% by volume of tributyl phosphate and 75% of dibutyl ether. Phase separation was completed after twenty-five seconds. The distribution coefficients (organic/aqueous) obtained were 0.27 for nitric acid, 0.77 for thorium and 0.005 for rare earth metal values. The separation factor for thorium with respect to rare earths was ascertained to be 154. These values show that an excellent separation of the thorium salts from rare earth metal salts can be accomplished by the process of this invention. This makes the process of the invention very useful in the separation of metal values from monazite solutions.

Another very useful application of the process of this invention is for the separation of uranium from ruthenium and other fission products since the ruthenium and other fission products mainly remain in the aqueous phase while the uranium is preferredly extracted into the solvent phase.

The invention is also advantageous for the extraction and recovery of cerium values from aqueous solutions. However, the cerium has to be present in the tetravalent state, and it is therefore necessary to treat the solution prior to cerium extraction for conversion of the cerium to the tetravalent state. This can be done either electrolytically or by chemical methods, for instance by treating the solution with a bromate solution in concentrated nitric acid, such as sodium bromate in 8 to 10 N nitric acid.

Likewise, plutonium values are extractable according to the process of this invention provided that it is present in at least the tetravalent state. Plutonium(III) salts are not extractable. It is preferred that plutonium be present in the tetravalent state. In order to reduce hexavalent plutonium and secure the plutonium in the preferred tetravalent state, it is preferably first reduced to the trivalent state and then oxidized with sodium nitrite.

In all the cases described herein, the extracted metal values may be back-extracted from the solvent phase either collectively or selectively by various methods known to those skilled in the art.

Well-known extraction procedures and apparatus may be used in carrying out the process of this invention. Thus, the extraction steps may be effected by the use of batch, continuous batch, batch countercurrent or continuous countercurrent methods. An especially efficient extraction is obtained by the use of the continuous countercurrent method. In the case of batch operation contact between the two phases is intensified by agitation, centrifuging or the like. In all cases, the ratio of liquid organic solvent to initial aqueous solution may vary widely, e.g., from 1:10 to 10:1, and the optimum ratio will depend upon the particular organic solvent and the concentrations used. The organic solvent may be either the dispersed phase or the continuous phase; however, the former is the preferred type.

The extraction of uranium and of cerium with alkyl phosphate is covered by the copending applications Serial No. 142,707, filed February 6, 1950, and granted as U.S. Patent No. 2,848,300 on August 19, 1958, and Serial No. 92,956, filed May 12, 1949, and granted as U.S. Patent No. 2,564,241 on August 14, 1951, respectively, by James C. Warf.

It will be understood that this invention is not to be limited to the details given herein but that it may be modified within the scope of the appended claims.

What is claimed is:

1. A process for separating thorium values from rare earth metal values contained in aqueous solutions, comprising providing a mineral acid content of from 3 to 7 N in said solution, mixing from 10 to 25% by volume of tributyl phosphate and from 90 to 75% by volume of dibutyl ether, contacting the aqueous solution with the mixture obtained, and separating an aqueous phase containing said rare earth metal values from a solvent extract phase containing said thorium values.

2. The process of claim 1 wherein the mixture consists of about 20% by volume of tributyl phosphate and 80% by volume of dibutyl ether.

References Cited in the file of this patent

UNITED STATES PATENTS

| | | |
|---|---|---|
| 1,966,729 | Loomis | July 17, 1934 |
| 1,968,544 | Vana | July 31, 1934 |
| 2,225,633 | Hill et al. | Dec. 24, 1940 |
| 2,227,833 | Hixson et al. | Jan. 7, 1941 |
| 2,796,320 | Spedding | June 18, 1957 |
| 2,848,300 | Warf | Aug. 19, 1958 |
| 2,883,264 | Warf | Apr. 21, 1959 |

OTHER REFERENCES

Templeton, Journal of Physical and Colloid Chemistry, volume 51, pages 1441–1449 (1947). Copy in Sci. Lib.